July 3, 1945.　　　　　J. J. KISPERT　　　　　2,379,444
CORSET
Filed Sept. 25, 1943　　　　6 Sheets-Sheet 1

Inventor
JOSEPH J. KISPERT
Attorney

July 3, 1945.  J. J. KISPERT  2,379,444
CORSET
Filed Sept. 25, 1943    6 Sheets-Sheet 2

Inventor
JOSEPH J. KISPERT

By
Attorney

July 3, 1945. J. J. KISPERT 2,379,444
CORSET
Filed Sept. 25, 1943 6 Sheets-Sheet 3

Inventor
JOSEPH J. KISPERT

July 3, 1945.  J. J. KISPERT  2,379,444
CORSET
Filed Sept. 25, 1943   6 Sheets-Sheet 5

Inventor
JOSEPH J. KISPERT
By
Attorney

July 3, 1945.　　　　J. J. KISPERT　　　　2,379,444
CORSET
Filed Sept. 25, 1943　　　　6 Sheets-Sheet 6

Inventor
JOSEPH J. KISPERT
By Ross J. Woodward,
Attorney

Patented July 3, 1945

2,379,444

UNITED STATES PATENT OFFICE 2,379,444

CORSET

Joseph J. Kispert, Branford, Conn.

Application September 25, 1943, Serial No. 503,798

17 Claims. (Cl. 2—39)

This invention relates to corsets and it is one object of the invention to provide a corset having an improved construction whereby the inner vest and outer closure portions may be drawn firmly about a person's body and a flat front effect produced and, in addition, an uplift obtained which will raise and flatten the abdomen. It will thus be seen that the diaphragm and muscles of the abdomen will be well supported and a trim appearance imparted to a person's figure.

Another object of the invention is to provide the corset with an arrangement of looped tapes through which laces are passed so that as the closure flaps are drawn toward each other, tension will be exerted on the inner vest and cause the vest to be held flat and the fasteners of the sections held firmly in engagement with each other. Therefore, the sections of the vest will be prevented from accidentally working out of latched engagement with each other and also held flat so that wrinkles will not form which would be uncomfortable to the wearer as well as unsightly.

Another object of the invention is to provide a corset in which hooks for engagement by laces are omitted and fabric tapes used instead, thus eliminating lace-engaging members which have a tendency to protrude outwardly when a corset is worn under a dress of thin material and show through the dress.

Another object of the invention is to provide the corset with lace-engaging loops of fabric tapes so arranged that the laces may be very easily passed through the loops and the corset easily tightened until it applies the desired support to portion of the body about which the corset fits.

Another object of the invention is to provide a corset having an improved arrangement of lacing which allows the corset to be held snugly in place and eliminates necessity for incorporating elastic sections in the corset.

Another object of the invention is to provide a corset which may be laced according to the way the wearer feels in the morning when applying the corset and will remain comfortable the rest of the day.

Another object of the invention is to provide the corset with an improved arrangement of closure portions and lacings which may be either at the front of the corset, at the back thereof, or along a side.

Another object of the invention is to provide a corset which is light in weight and, therefore, more comfortable, as it does not cause a person to become overheated during hot weather.

Another object of the invention is to provide a corset of such construction that it may be easily applied, quickly laced, produce a straight front effect, and impart uplift to the diaphragm and support to the abdomen, and remain comfortable in place while being worn.

The invention is illustrated in the accompanying drawings, wherein.

Figure 1:
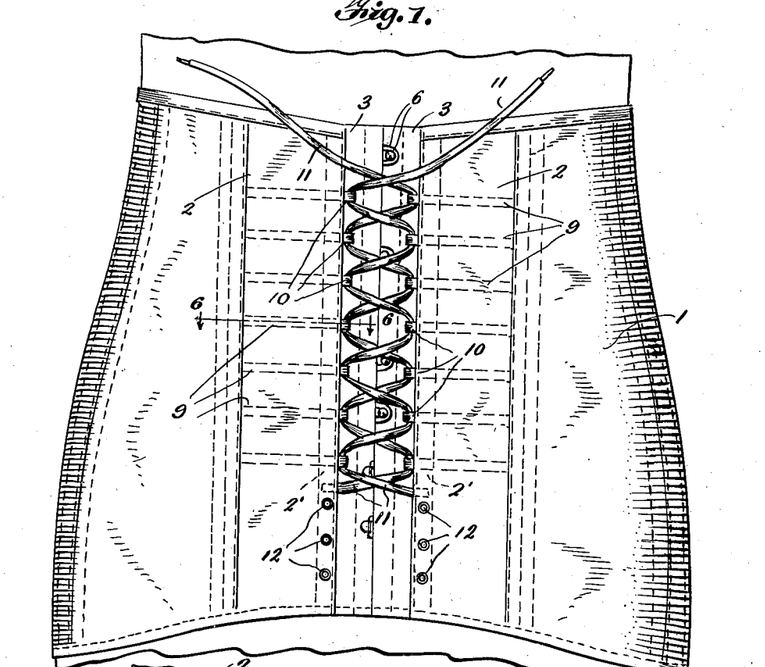
Fig. 1 is a front view of one embodiment of the improved corset before the laces are tightened.
Figure 2:
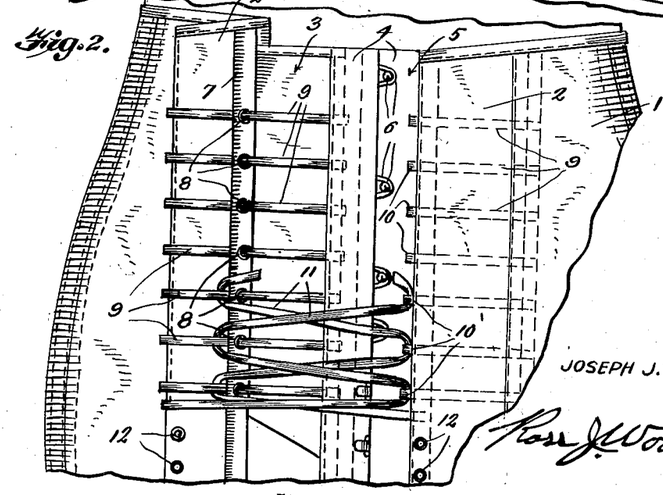
Fig. 2 is a fragmentary view in front elevation showing one of the closure portions turned outwardly.
Figures 3, 4, 5, 6:
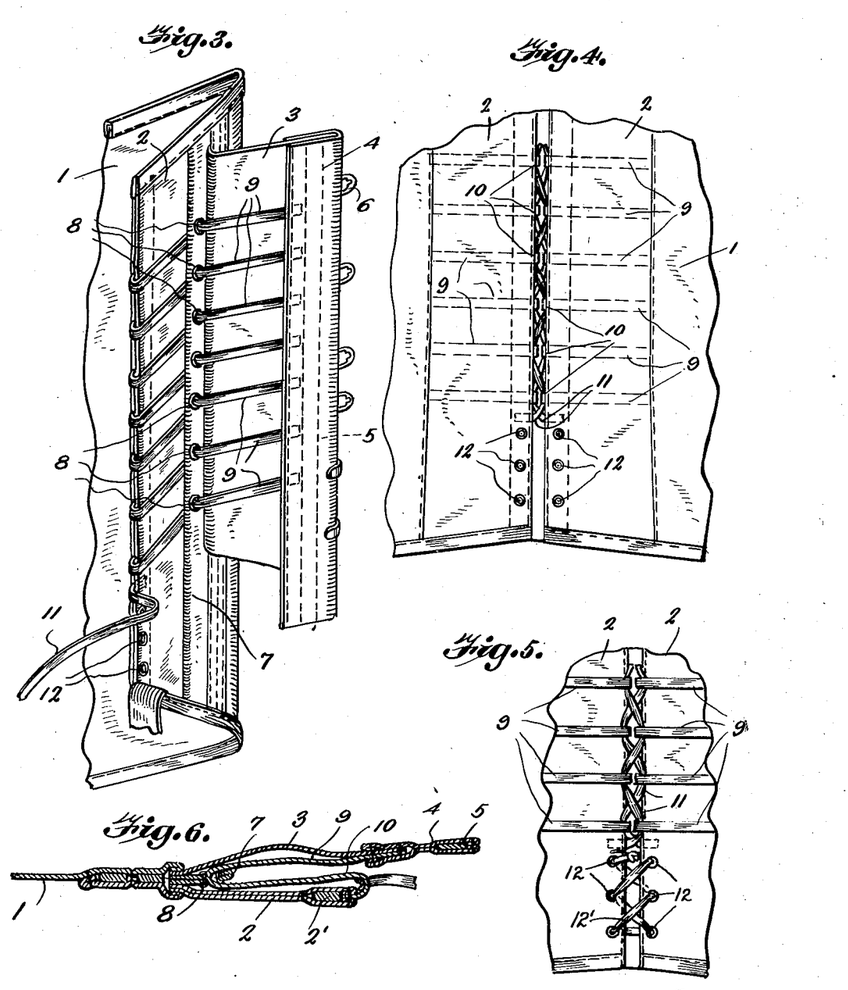
Fig. 3 is a perspective view of a portion of the improved corset, showing the manner in which the lace-engaging tapes are applied.
Fig. 4 is a fragmentary view in front elevation showing the laces tightened.
Fig. 5 is a view looking at inner faces of the closure portions with the laces tightened.
Fig. 6 is a fragmentary sectional view on the line 6—6 of Fig. 1.
Figure 22:
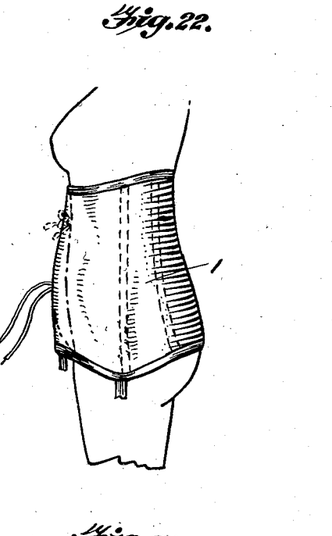
Fig. 22 is a diagrammatic view in side elevation, illustrating the manner in which a corset of the improved construction flattens and uplifts the abdomen and diaphragm of a person wearing the corset.

This improved garment has been referred to as a corset, but it is to be understood that the term "corset" covers a girdle, foundation garment, or other garments of this general class. The body 1 of the garment may be formed of any desired material and may be elastic or non-elastic, in accordance with the judgment of the manufacturer making the same. Closure portions 2 are provided at the front of the garment and when these closure portions are closed and secured they are disposed in covering relation to a vest consisting of sections 3 which are preferably formed at their outer side portions of material similar to that used for the body and its closure portions and at their inner side portions of lighter material, but they may be formed of any material found suitable. Along free side edges of the vest sections are bindings 4 having embedded therein stays 5 carrying interengaging fasteners 6 which may be hooks and eyes, as shown, or other specific forms of fasteners. The stays 5 terminate in spaced relation to the lower ends of bindings 4. Along the junction of inner side edges of the vest sections 3 with the closure portions or flaps 2 of the body, are strips 7 formed of folded fabric which preferably extend the full length or height of the body and carry eyelets 8 through which are passed tapes 9. These tapes extend transversely across the inner faces of the closure portions 2 and outer faces of the vest sections 3 and have their inner ends secured in the bindings 4 of the vest sections and their outer ends folded back upon themselves and tucked into free side edges of the closure portions, where they are sewed or otherwise firmly secured. The outer side edges of the closure portions are reinforced by stays 2' and these stays have their lower ends spaced from lower ends of the closure portions. Since outer end portions of the tapes are folded back upon themselves before being secured in the free side edges of the closure portions 2, they form loops 10 which protrude from the closure portions and are intended to receive the laces 11. These laces have their lower ends secured in lower portions of the free side edges of the closure portions and are passed back and forth between the closure portions, as shown in Figs. 1 and 2. After the laces have been passed through the loops of the tapes 9, pull is exerted on the laces to draw the closure portions toward each other and tighten the corset about a person, and, referring to Fig. 6, it will be seen that pull exerted by the tightened laces will draw the tapes 9 through the eyelets 8 and inner ends of the tapes will exert pull upon the vest sections. Therefore, the vest will be pulled transversely and strain exerted will cause the fasteners 6 to remain in engagement with each other. It should also be noted that strain exerted by the tightened laces and tapes will contract the corset snugly about the person and also exert uplift, and the abdomen and diaphragm will be supported and uplifted, as indicated by dotted lines in the diagrammatic view shown in Fig. 22 of the drawings. This causes the corset to be very comfortable and, since pull upon the tapes holds the vest flat and eliminates wrinkles, it will be smooth and discomfort due to rough places will be eliminated. A number of eyelets 12 are mounted through the flexible lower portions of free side edge portions of the closure portions 2 to receive other laces 12' by means of which the lower ends of the closure portions are to be drawn inwardly and upwardly, but it will be understood that tapes may be substituted in lieu of these eyelets. In view of the fact that the laces 11, held by the tips of a thumb and forefinger, are readily passed through large loops formed by the tapes 9, they may be very easily engaged with these loops instead of having to be threaded through small eyelets, or engaged with small hooks, and the corset may be easily put on and quickly laced, and the lacing will be practically invisible, even through a thin dress. Since the laces engage looped tapes, there will be a definite relation of control and uplift imparted to the body and the vest, when the laces are tightened, and a person wearing the improved garment will be assured of proper fit and proper uplift of the abdomen, diaphragm, and other portions of the body. The outer side portions of the vest sections will be held under tension and thus free of wrinkles, while any wrinkling which may occur will be limited to the inner side portions of the vest sections and rendered unobjectionable because they may, as above stated, be made of lighter material.

Figure 7:
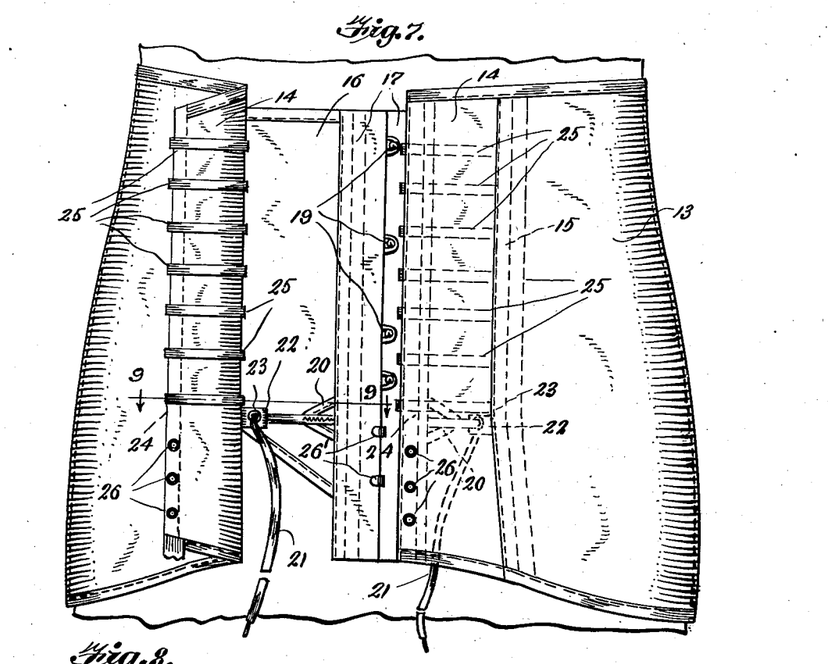
Fig. 7 is a front elevation of a corset having a modified construction.
Figure 8:
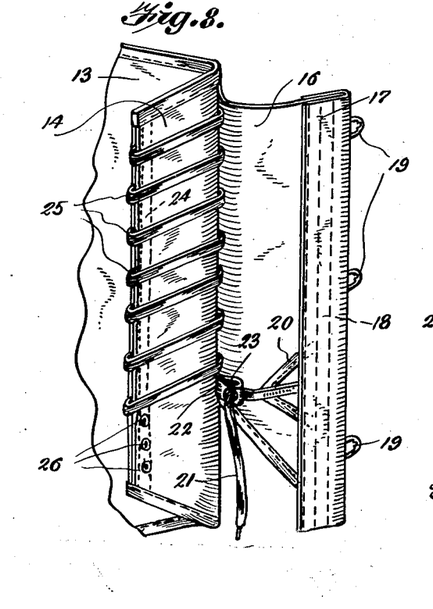
Fig. 8 is a perspective view of a closure portion and vest section of Fig. 7.
Figure 9:
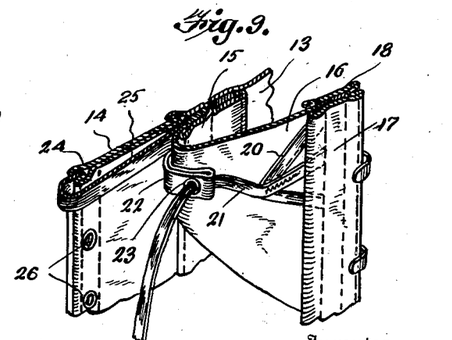
Fig. 9 is a sectional view on the line 9—9 of Fig. 7.

In Figs. 7, 8 and 9, there has been illustrated a corset of a modified construction. In this embodiment of the invention, the body 13 may be a girdle, as shown, or any other form of corset, and is provided with closure portions or flaps 14 sewed to the body along stays 15. The vest, which is under the closure flaps, consists of sections 16 which are also sewed into the stays 15 and along their free side edges are provided with bindings 17 in which are stays 18 carrying fasteners 19 and having their lower ends spaced from lower ends of the bindings. At the inner edges of the bindings are triangular tabs 20 and across these tabs are laces 21 which are sewed to the tabs and have their ends sewed into the bindings. The tabs are spaced from lower ends of the bindings at approximately the lower ends of the stays 18 and opposite these tabs are short tabs 22 formed of folded tapes which are sewed into the seams along inner side edges of the flaps 14 and carry eyelets 23 through which the laces are threaded. Outer side edges of the flaps or closure portions are reinforced by stays 24 which terminate in spaced relation to the lower ends of the flaps and, in the outer side edges of the flaps are sewed the looped outer ends of tapes 25 which extend transversely across the inner faces of the closure portions and have their inner ends sewed into the seams enclosing the stays 15.

When this corset is worn, it is placed about a person in the usual manner and the fasteners 19 of the vest sections interengaged to hold the vest closed. Lower edges of the vest sections are cut diagonally to form the vest with a tapered lower portion and the pliable lower portions of the bindings 17 carry fasteners 26' which may be hooks and eyes or other preferred forms of fasteners. After the vest sections have been secured, the closure portions or flaps 14 are brought toward each other and the laces 21 passed back and forth through the looped tapes 25, the laces being tightened as desired and then tied. When the laces are tightened, they not only draw upon the closure portions to exert uplift to the diagraphm and abdomen, but also exert transverse pull on the tabs 20 on the vest sections. This pull is at the inner side edges of the bindings 17 and tends to maintain the fasteners 19 in engagement with each other and hold the vest sections smooth. As the tabs 20 are located at the lower ends of the stays 18, this transverse pull keeps the ends of the stays from bending outwardly and creating an unsightly appearance. Since the lower portions of the vest sections and closure members are soft and pliable they may be held in place by laces threaded through the eyelets 26 and tied after being tightened, and their lower ends will not dig into the abdomen of the wearer when sitting or leaning over.

Figure 10:
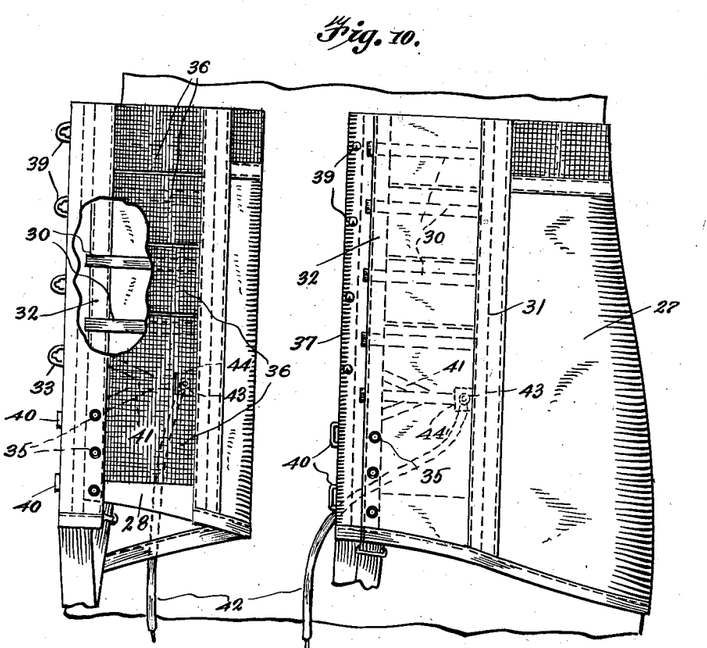
Fig. 10 is a front view of another modified form of corset.
Figure 11:
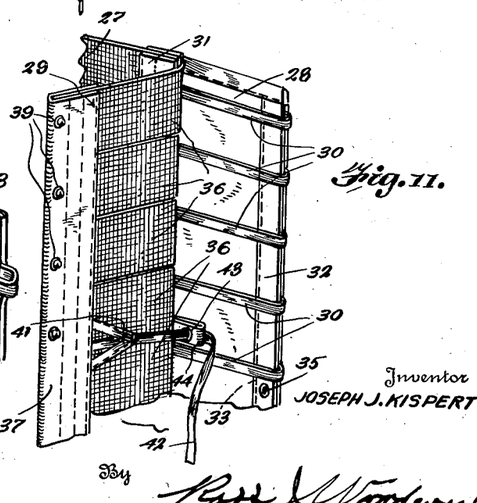
Fig. 11 is a perspective view of a portion of the corset shown in Fig. 10.
Figure 12:
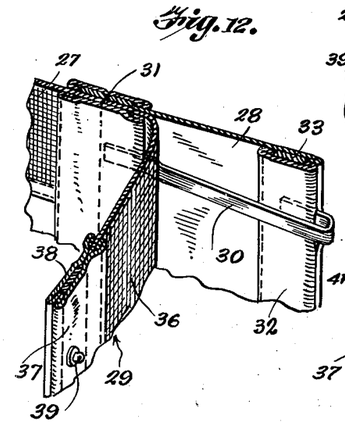
Fig. 12 is a fragmentary view in perspective, illustrating the manner in which the tapes of the corset illustrated in Fig. 10 are mounted.

A corset or girdle of another modified construction has been illustrated in Figs. 10, 11 and 12. This corset or girdle has a body 27, closure portions 28, and a vest formed of sections 29. This form of corset is similar in construction to that illustrated in Figs. 7, 8 and 9, and the closure portions or flaps carry looped tapes 30 having their inner ends sewed into the seams or stays 31 connecting the inner side edges of the closure members with the body and their outer end portions folded back upon themselves and sewed into bindings 32 along outer side edges of the closure portions. Stays 33 extend longitudinally in the bindings with their lower ends terminating in upwardly spaced relation to lower ends of the bindings and portions of the closure members below the stays will thus be soft and pliable and will not dig into a person when the garment is worn, and lower portions of the closure portions are secured by laces threaded through eyelets 35 mounted through lower end portions of the free side edges of the closure portions.

The vest sections 29 are formed from wide strips of elastic fabric 36 disposed one above another and having their inner ends sewed into the seams or stays 31 and their outer ends sewed into bindings 37 which are reinforced by stays 38 and carry interengaging fasteners 39 by means of which the two vest sections are held in closing engagement with each other. The stays terminate in spaced relation to lower ends of the bindings 37 to provide soft pliable lower portions for the free side edges of the vest sections and these soft lower portions carry fasteners 40 which may be hooks and eyes, or other forms of fasteners. Tapes are folded to form tapered tabs 41 which are sewed into inner side edge portions of the bindings 37 and taper toward their free ends. Laces 42 have their inner ends sewed into the bindings 37 and are also sewed to free ends of the tabs from which they extend and are threaded through eyelets 43 carried by tabs 44 which are formed from folded tapes and sewed between side edge portions of the stays and inner side edge portions of the closure flaps and the vest sections. These laces are passed back and forth through the looped tapes 30 and when tightened, draw the closure flaps toward each other and, at the same time, exert transverse pull against the bindings 37 of outer side edge portions of the vest sections. Therefore, the closure flaps will be drawn snugly into place and the vest also placed under tension, bindings of the vest sections being placed under transverse strain to hold the fasteners 39 in engagement with each other. The fact that the vest sections are formed of elastic fabric and are stretched in order to interengage the fasteners 39, aids in uplifting the abdomen and diaphragm. Since the laces are passed through looped tapes which lie flat against the closure flaps and the vest sections, the corset or girdle will be smooth along its closure and not detract from the appearance of a dress as there are no hooks or the like protruding outwardly from the closure flaps.

Figures 13, 14, 15, 16, 17:
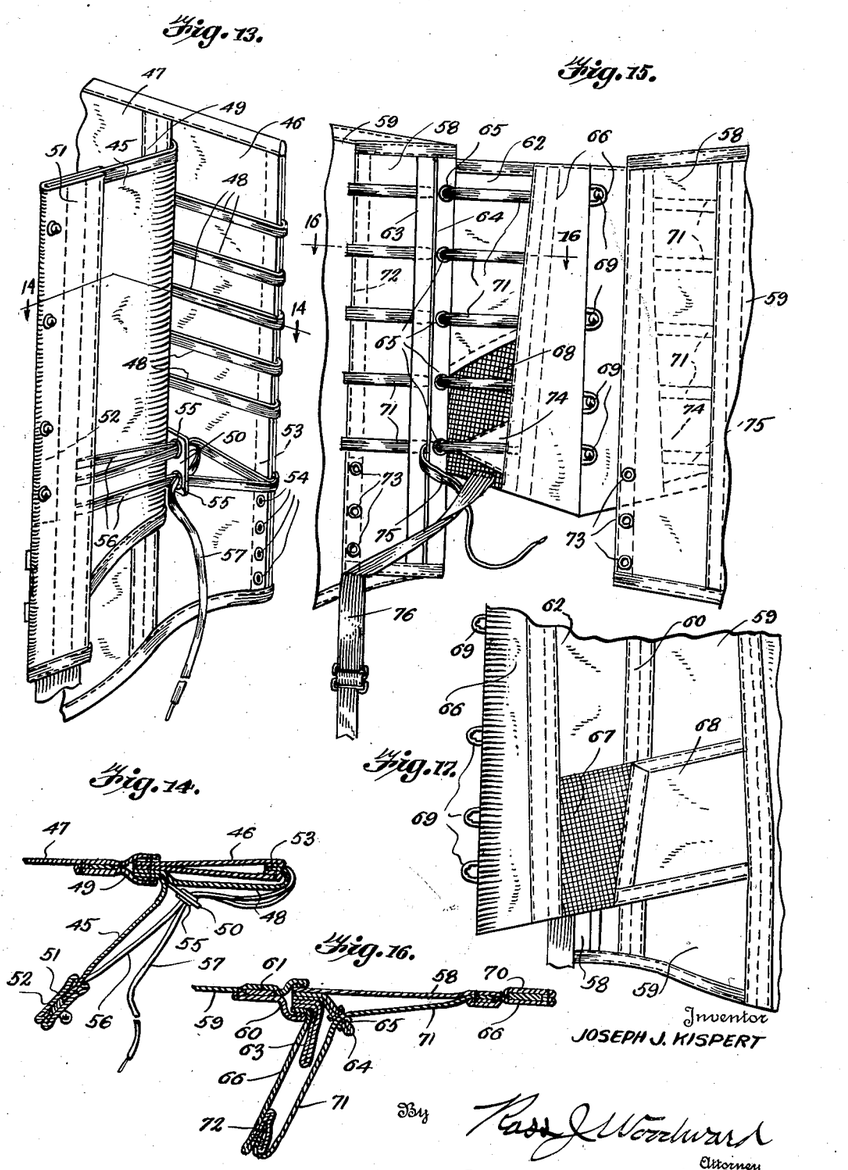
Fig. 13 is a fragmentary perspective view of a corset having another modified construction.
Fig. 14 is a sectional view on the line 14—14 of Fig. 13.
Fig. 15 is a fragmentary front view of still another modified form of corset.
Fig. 16 is a sectional view on the line 16—16 of Fig. 15.
Fig. 17 is a fragmentary view looking at the inner face of a portion of Fig. 15.

Figs. 13 and 14 illustrate a modified arrangement of laces. Only one vest section 45 and one closure portion or flap 46 have been shown, but it is to be understood that the body 47 of the corset has a pair of companion vest sections and a pair of companion closure portions, the same as in the corsets previously illustrated and described. Looped tapes 48 extend transversely across inner faces of the closure flaps with their ends sewed into the seam or stay 49 and the free outer side edge of the closure flap and a tab 50 formed of fabric is sewed into the seam between inner side edges of the vest section and the closure flap. This tab is located near the lower end of the inner side edge of the vest section which has its lower edge cut to extend forwardly at a downward angle and thus provide the vest with a tapered lower portion and lower ends of the bindings 51 for the vest sections project downwardly from front ends of the diagonally cut lower edges. A stay 52 carrying fasteners is mounted within the binding with its lower end spaced from the lower end of the binding so that the lower portion of the vest will be soft and pliable. A stay 53 reinforces the free outer side edge of the closure flap from its upper end to a point spaced upwardly from its lower end, thus providing the closure flap with a soft lower end portion through which eyelets 54 are mounted to receive a lacing. The tab 50 carries eyelets 55 through which tapes 56 pass, and these tapes have their ends sewed into the inner side edge of the binding 51 and the free outer side edge of the closure flap, ends of the tapes which are sewed into the closure flap being brought together, as shown in Fig. 13. A lace 57 has its inner end sewed into the inner side edge of the binding 51 of each vest section between the spaced ends of the tape 56 and this lace is threaded rearwardly through one eyelet 55 and then brought back upon itself and threaded forwardly through the other eyelet. When the laces 57 are passed back and forth between the closure flaps and through the looped tapes 48, after the vest sections have been hooked together, pull is exerted upon the laces to close the front opening of the corset and strain exerted on the bindings 51 to smooth the vest sections and uplift the abdomen and diaphragm and since the strain tends to urge the bindings of the two vest sections away from each other, the fasteners for the vest sections will be prevented from slipping out of engagement with each other.

Another modified form of corset or girdle has been illustrated in Figs. 15, 16 and 17. In this embodiment of the invention, closure portions or flaps 58 are connected with the body 59 by seams 60 reinforced by stays 61. The vest sections 62 are also sewed into the seams 60 and between the inner side edges are strips 63 and 64 formed from folded strips of fabric. The strips 63 and 64 extend the full length of the corset or girdle but the strip 64 is of less width than the strip 63 and carries eyelets 65. The binding 66 for the free front side edge of the vest section is quite wide and of appreciably greater length so that its lower portion projects downwardly from the web of the vest section. The outer forward side edge of a strip of elastic webbing 67 forming the forward portion of an abdominal band 68 is sewed into the portion of the binding projecting downwardly from the vest section. This abdominal band extends forwardly at a downward angle and the upper portion of its elastic portion is overlapped by the lower portion of the companion closure flap. By this arrangement, the abdominal bands of the girdle will uplift the abdomen when the fasteners 69 carried by the stays 70 of the bindings 66 are engaged with each other to hold the vest sections closed. Tapes 71 are threaded through the eyelets 65 of strip 64 and have their inner ends sewed into the inner edge portion of the binding 66 and their outer ends folded back upon themselves and sewed into the free front side edges of the closure flaps to form loops of the tapes. The closure flap is reinforced along its free side edge by a stay 72 terminating at approximately the lower tape 71 and below this tape the marginal edge of the closure flap is soft and pliable and carries eyelets 73. Tabs 74 are sewed into the inner edge portions of the bindings 66 near the lower ends thereof and these tabs are tapered toward their outer ends and carry laces 75 which are threaded through the lower eyelets 65 of the companion strips 64. When the laces are passed through the looped tapes 71 and pulled tight, they exert pull on the tabs and also upon the tapes and the vest will be stressed transversely and its fasteners 69 held in engagement with each other while, at the same time, the closure sections or flaps will be stretched tight to uplift the abdomen and the diaphragm. The garters 76 are secured to lower ends of the companion vest sections and closure flaps, this being true of garments covered by all the embodiments of the invention.

Figure 18:
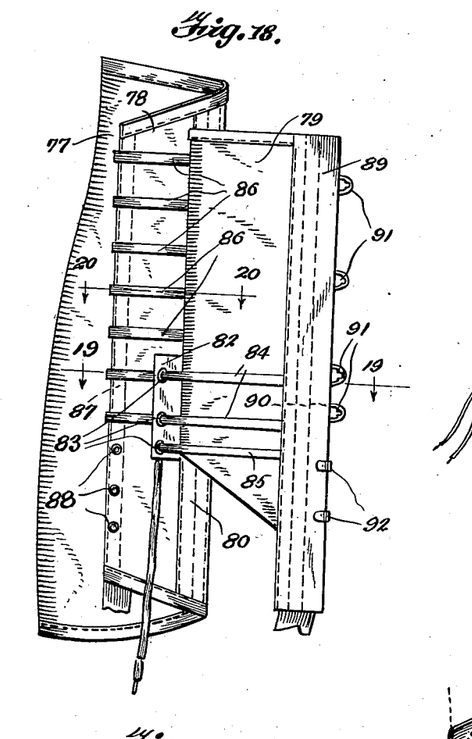
Fig. 18 is a fragmentary view of another modified form of corset.
Figure 19:
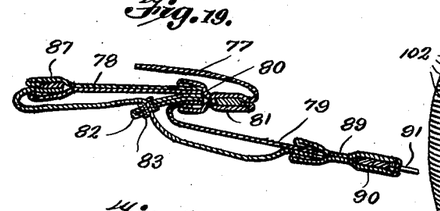
Fig. 19 is a sectional view on the line 19—19 of Fig. 18.
Figure 20:
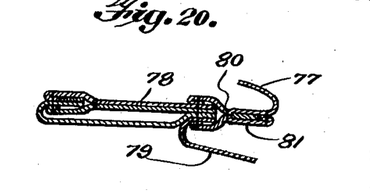
Fig. 20 is a sectional view on the line 20—20 of Fig. 18.

In the embodiment of the invention illustrated in Figs. 18, 19 and 20, the body 77 of the corset is open along its front and at opposite sides of the front opening carries closure portions 78 and vest sections 79 which have their inner side edges sewed into a seam 80 reinforced by a stay 81. The closure portions and the seams into which they are sewed extend the full length of the corset but the vest sections terminate in spaced relation to the lower ends of the seams. A tab 82 formed of folded fabric is sewed into each seam between the companion closure flap and vest section, and, referring to Fig. 18, it will be seen that the tab is located along the lower end portion of the vest section and is of sufficient length to accommodate three eyelets 83 to accommodate tapes 84 and lacing 85. Additional tapes 86 extend transversely across the inner face of the closure flap with their inner rear ends sewed into the seam 80 and their outer ends folded back to form loops and sewed into the free front side edge of the closure flap which is reinforced by a stay 87 extending from the upper end of the closure to a point adjacent the lower tape 84. Below this stay 87 the closure flap is soft and pliable and carries lace-receiving eyelets 88. A binding 89 extends along the free front edge of the vest section with its lower portion projecting downwardly, as shown in Fig. 18, and the binding of each vest section has embedded therein a stay 90 carrying fasteners 91 for holding the vest sections in closing engagement with each other. The lower edges of the vest sections are cut to extend forwardly at a downward angle and the stay 90 for each section terminates in spaced relation to the lower end of the binding to provide a soft and pliable lower portion which carries fasteners 92. The lacing 85 has its inner end sewed into the inner side edge of the binding 89 and, when the lacings are passed back and forth and through the looped outer ends of the tapes 84 and 86 and pulled tight, the closure flaps will be drawn toward each other and, at the same time, pull upon the tapes 84 will cause transverse strain to be applied to the bindings 89 of the vest sections and the fasteners 91 maintained in engagement with each other. The closure flaps and the vest sections will thus be held firmly in place to flatten and uplift the abdomen and the diaphragm.

Figure 21:
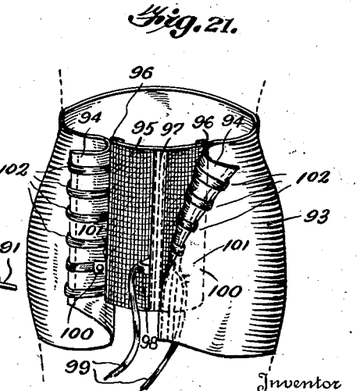
Fig. 21 is a front view of still another form of corset.

In Fig. 21, there has been illustrated an embodiment of the invention wherein the body 93 may be a girdle, as shown, or any other specific form of corset. This corset or girdle is of the "step-in" type and has an opening which may be at the front, back, or any other location desired. The closure portions or flaps 94 are free along their outer side edges and, when closed, overlie the vest 95 which is sewed along its side edges to the body, as shown at 96. A reinforcement 97 extends longitudinally of the vest midway the width thereof and in spaced relation to the lower end of the reinforcement are tabs 98 carrying lacings 99 adapted to be threaded through eyelets 100 carried by tabs 101 sewed into seams 96 between the closure flaps and the side edges of the vest in spaced relation to their lower ends. After the laces have been passed through the eyelets, they are passed back and forth between the closure flaps and through looped tapes 102 extending transversely across the inner faces of the closure flaps and the laces tightened to draw the closure flaps toward each other to closed position. At the same time, the laces exert pull on the tabs and place the vest under tension so that it will be held smooth and uplifting pressure applied. It will thus be seen that the abdomen and the diaphragm will be flattened and uplifted, the same as in the forms of corsets previously described, the main difference between this form of corset and the others being that the vest is a one-piece closed structure instead of being formed of two corset sections having outer side edges detachably engaged with each other.

In each instance, the closure portions, the vest, and the laces have such relation to each other that, when the laces are passed back and forth through looped tapes and tightened, uplifting force will be exerted and the vest will be held smooth so that wrinkles will be eliminated and a snug fit obtained. The fact that the laces are passed through looped tapes instead of being engaged with hooks or equivalent guides, eliminates projections which might show through a thin dress and detract from the appearance thereof.

It will also be understood that the use of large loops of tape through which laces held by the tips of two or more fingers can readily be passed, is advantageous in any type of laced corset, whether front, back or side lace, by reason of the extreme facility with which the garment can be laced and the smooth appearance created through the elimination of hooks or eyelets likely to show through a thin dress. Furthermore, it will be understood that the use of large loops of tape is especially advantageous in garments where the lacing overlies an inner vest or a shield, in that such tapes, or a portion of them, can be so arranged as to exert a transverse pull on the vest or shield and prevent it from wrinkling when the laces are tightened.

Having thus described the invention, what is claimed as new is:

1. A garment comprising a body having closure portions along an opening for the body, vest sections under said closure portions having interengaging fasteners along free side edges, tapes under said closure portions extending transversely thereof and having folded ends secured to free side edges thereof and projecting outwardly therefrom, and laces passed back and forth between the closure portions and between folded tapes and confronting faces of the closure portions and tightened to draw the closure portions toward each other to closed position.

2. A garment comprising a body having a vest and closure portions outside the vest, said vest having companion sections provided with interengaging fastener members along outer side edges thereof, lace-engaging tapes connected with free side edges of said closure portions and with inner side edge portions of the vest sections, and laces adapted to be engaged with said tapes and tightened to exert pull on the tapes to draw the closure portions toward each other to closed position and exert pull on the vest sections in a direction away from each other to smooth and flatten said vest sections and hold the fastener members thereof in engagement with each other.

3. A garment comprising a body having a vest and closure portions outside the vest, said vest having companion sections provided with interengaging hooks and eyes for releasably holding the vest sections closed, tapes secured at their ends to the closure portions and said vest sections and forming loops adjacent free side edges of the closure portions, and laces passed back and forth between the free side edges of the closure portions and through said loops and when tightened exerting pull upon the tapes to draw the closure portions toward each other to closed position flat against the vest and exert pull on the vest sections in a direction away from each other to smooth and flatten the vest and maintain the hooks and eyes in engagement with each other.

4. A garment comprising a body having closure portions and vest sections under the closure portions provided with detachably interengaging fasteners along free outside edges, guides mounted between inner side edge portions of the closure portions and the vest sections, tapes slidably engaged with said guides and having inner ends secured to said vest sections and outer ends secured to said closure sections, and laces passing back and forth between free side edges of said closure portions and through said tapes and exerting pull upon the tapes to apply transverse strain upon the vest sections and closure portions.

5. A garment comprising a body having closure portions and vest sections under the closure portions provided with detachably interengaging fasteners along free side edges, members mounted between inner side edge portions of companion vest sections and closure portions and provided with eyelets, tapes slidably passing through said eyelets and having their inner ends secured to the vest sections and their outer end portions folded back upon themselves and secured to the closure portions to form loops, and laces passed back and forth through the looped tapes and tightened to exert pull upon the looped outer portions of the tapes and draw the closure portions toward each other while inner ends of the tapes exert transverse strain upon the vest sections.

6. A garment comprising a body having closure portions and vest sections under the closure portions provided with detachably interengaging fasteners along free outer side edges, said vest sections having their lower ends spaced upwardly from lower ends of the closure portions and their lower edges cut to extend forwardly at a downward incline, bindings for the free front side edges of the vest sections, stays in said bindings carrying fasteners for detachably holding the vest sections in closed engagement with each other, strips mounted between inner side edge portions of companion closure portions and vest sections, eyelets carried by said strips, tapes threaded through said eyelets and having inner ends sewed into the bindings of the vest sections and outer ends sewed to outer side edges of the closure portions, and laces carried by the vest sections and passed back and forth through outer end portions of said tapes and tightened to exert pull upon the tapes to draw the closure portions toward each other to closed compressing and uplifting position while inner ends of the tapes exert transverse strain upon the vest sections.

7. A garment comprising a body having closure portions and vest sections under the closure portions provided with detachably interengaging fasteners along free outer side edges, said vest sections having their lower ends spaced upwardly from lower ends of the closure portions and their lower edges cut to extend forwardly at a downward incline, fasteners for detachably holding said vest sections closed, tapes extending transversely across inner faces of said closure portions and sewed at side edges of the closure portions, members secured between inner side edges of companion closure portions and vest sections, eyelets carried by said members, tabs carried by said vest sections adjacent free side edges thereof, and laces secured to said tabs and extending transversely across inner surfaces and threaded through the eyelets of said members, said laces being passed back and forth between said closure members and through outer end portions of said tapes and tightened to draw the closure members toward each other to closed position and simultaneously exert transverse strain on the vest sections.

8. A garment comprising a body having closure portions and vest sections under the closure portions provided with detachably interengaging fasteners along free outer side edges, said vest sections having their lower ends spaced upwardly from lower ends of the closure portions and their lower edges cut to extend forwardly at a downward incline, bindings for the free front side edges of the vest sections, stays in said bindings carrying fasteners for detachably holding the vest sections in closed engagement with each other, strips mounted between inner side edge portions of companion closure portions and vest sections, eyelets carried by said strips, tapes extending across inner faces of said closure portions and secured at their ends to inner and outer side edges of the closure portions, other tapes threaded through said eyelets and extending across the vest sections and said closure portions with ends secured in said bindings and to outer side edges of the closure portions, and laces passes back and forth between the closure portions and through the tapes and tied to hold the closure portions firmly closed and the closure portions and vest sections in compressing and uplifting engagement with a person's abdomen.

9. A garment comprising a body having closure portions and vest sections under the closure portions provided with detachably interengaging fasteners along free outer side edges, said vest sections having their lower ends spaced upwardly from lower ends of the closure portions and their lower edges cut to extend forwardly at a downward incline, bindings for the free front side edges of the vest sections, stays in said bindings carrying fasteners for detachably holding the vest sections in closed engagement with each other, strips mounted between inner side edge portions of companion closure portions and vest sections, eyelets carried by said strips, tapes extending across inner faces of said closure portions and secured at their ends to inner and outer side edges of the closure portions, other tapes threaded through said eyelets and extending across the vest sections and said closure portions with ends secured in said bindings and to outer side edges of the closure portions, and laces secured at inner side edges of the bindings and threaded through certain of the eyelets of said strips and then back upon themselves through other eyelets of the strips, said laces being passed back and forth through the tapes and tied to hold the closure portions firmly closed and the closure portions and vest sections in snug engagement with a person's abdomen.

10. A lacing arrangement for a garment having opposing edges to be laced together over an inner vest or shield, comprising a series of vertically spaced lace-receiving elements located in close proximity to each of said opposing edges and a pair of laces, each lace being secured at one end to the inner vest or shield at a point spaced laterally from its vertical center line and arranged to pull initially in a direction away from said center line.

11. A lacing arrangement for a garment having opposing edges to be laced together over an inner vest or shield, comprising two series of vertically spaced strips of tape, each tape of each series being secured at one end to one of said edges and doubled back across the inner surface of the corset and engaged with the garment at a point at a distance from said edge and cooperating with the material of the garment to form a lace-receiving loop through which the tips of a thumb and forefinger holding a lace can be readily passed, and a pair of laces, each lace being secured at one end to the inner vest or shield at a point spaced laterally from its vertical center line and arranged to pull initially in a direction away from said center line.

12. A lacing arrangement for a garment having opposing edges to be laced together over an inner vest or shield, comprising two series of vertically spaced strips of tape, each tape of each series being secured at one end to one of said opposing edges and doubled back across the inner surface of the garment to a point at a distance from said edge to form with the material of the garment a lace-receiving loop through which the tips of a thumb and forefinger holding a lace can readily be passed, at least some of said tapes being slidably passed through eyelets located at a distance from said edge and secured at their other ends to the vest or shield.

13. A garment comprising a body having a vest and closure portions outside the vest united therewith along side edges of the vest, laces for said closure portions, and transversely extending lace-engaging tapes secured at their ends to said closure portions and connected with said vest for exerting stress upon the vest transversely thereof when the laces are tightened to draw the closure portions to closed position.

14. A garment comprising a body having closure portions and vest sections under the closure portions, bindings for outer side edges of the closure portions and vest sections, stays in said bindings, the stays of the vest sections being provided with fasteners for detachably engaging each other and releasably holding the vest sections closed, the stays of the closure portions terminating in spaced relation to the lower ends of their bindings to provide the bindings with soft pliable lower portions, lace-engaging members carried by the soft lower portions of said bindings, tapes extending transversely across inner faces of the closure portions with their outer ends secured to outer side edges of the closure portions and other portions of the tapes mounted at the junction of the vest section with inner side edges of the closure portions, and laces passed back and forth between the closure portions and through loops defined by the closure portions and said tapes and tightened to draw the closure portions toward each other and hold same firmly in closed position against the vest sections.

15. A lacing arrangement for a garment having opposing edges to be laced together, comprising two series of vertically spaced strips of tapes, each tape of each series having one end secured at one of said opposing edges and folded back across a surface of the garment and attached at a point spaced transversely from said edge and cooperating with the material of the garment to form a lace-receiving loop through which the tips of fingers holding a lace can be readily passed when lacing the garment.

16. A garment comprising a body including closure portions having outer side edges free from each other, a vest under said closure portions secured along its side edges to the closure portions in transverse spaced relation to the free edges thereof, and tapes extending transversely across under faces of the closure portions and connected therewith at inner and outer side edges thereof and otherwise free from the closure portions and defining loops through which laces and fingers of a hand holding the laces may be passed between the tapes and the closure portions when applying the laces back and forth between the free side edges of the closure portions.

17. A garment comprising a body having closure portions, and tapes extending transversely across faces of the closure portions and connected therewith at sides of the closure portions and in transverse spaced relation thereto the tapes between said points of attachment being free from the closure portions whereby fingers holding laces may be readily passed between the tapes and the confronting faces of the closure portions when passing the laces back and forth between the closure portions and engaging the laces with the tapes.

JOSEPH J. KISPERT.